Jan. 10, 1967    G. B. MacKENZIE    3,297,277
CARRIER FOR PNEUMATIC TUBE SYSTEMS
Filed May 11, 1964    3 Sheets-Sheet 1
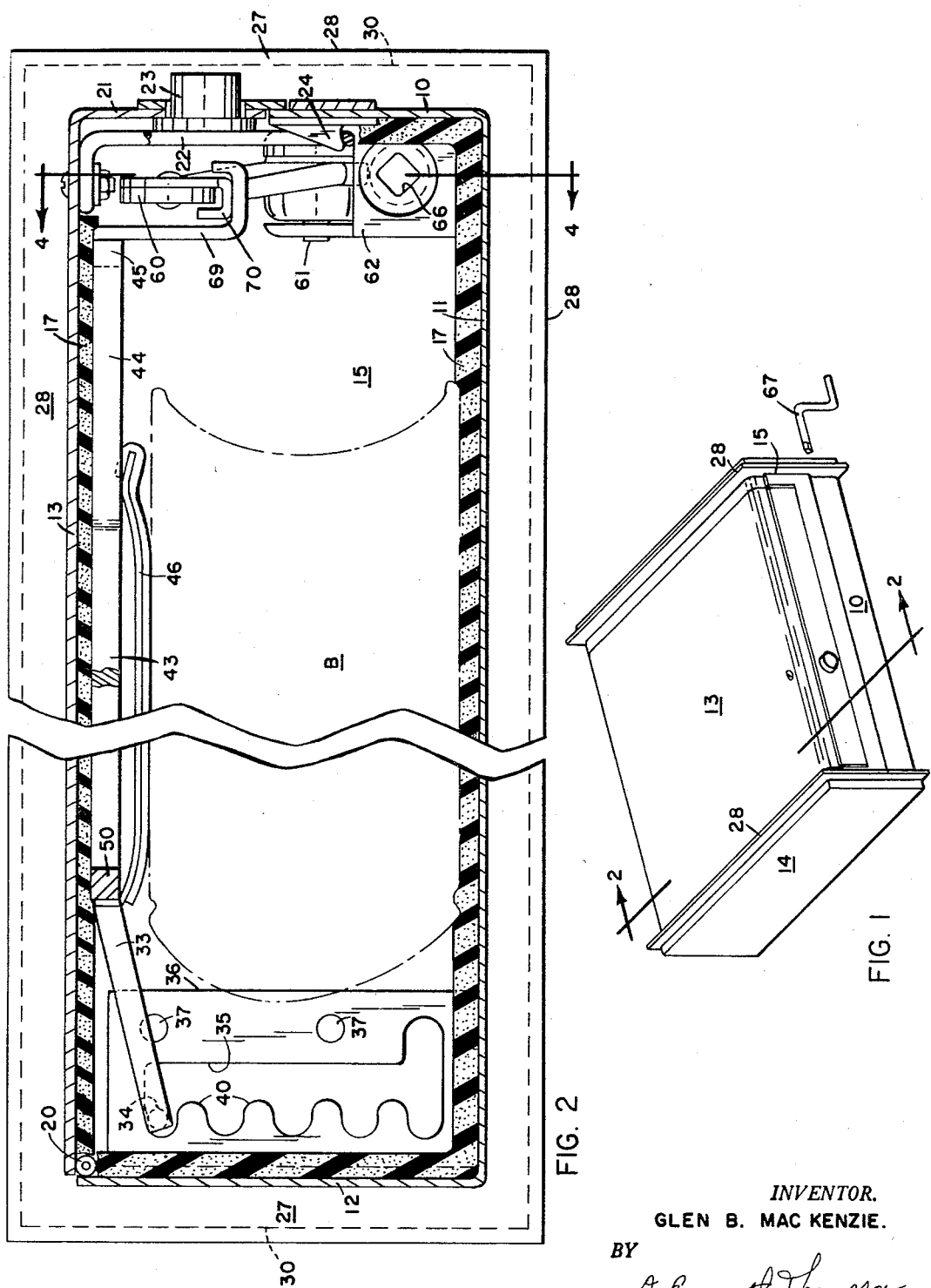
INVENTOR.
GLEN B. MAC KENZIE.
BY
D. Emmett Thompson
HIS ATTORNEY.

INVENTOR.
GLEN B. MAC KENZIE.
BY
D. Emmett Thompson
HIS ATTORNEY.

United States Patent Office 3,297,277
Patented Jan. 10, 1967

3,297,277
CARRIER FOR PNEUMATIC TUBE SYSTEMS
Glen B. MacKenzie, Pleasant Hill, Calif., assignor to Lamson Corporation, Syracuse, N.Y., a corporation of New York
Filed May 11, 1964, Ser. No. 366,398
3 Claims. (Cl. 243—34)

This invention relates to article carriers for pneumatic tube systems, and more particularly to a carrier provided with article clamping mechanism for clamping an article in the carrier against one wall thereof.

In pnuumatic tube systems, the article carriers are of one size, the carriers being of the largest dimension that that the tube system will accommodate. This to avoid investment, storing and handling, of a large number of carriers of different sizes, and also the carrier of given size functions more efficiently in the tube system. However, in some installations, the articles transported in the pneumatic tube system vary greatly in dimension as, for example, pneumatic tube systems installed in large libraries for transporting books from one section of the library to another.

In transporting articles that vary in size such as books, in pneumatic tube systems, the article is often damaged if it is of such dimension as to not fill the interior space of the carrier.

This invention has as an object an article carrier for pneumatic tube systems embodying an article clamping arrangement which is quick and convenient in operation, which will function to securely clamp articles of all dimensions up to the capacity of the carrier, and which does not in any way interfere with the insertion, or removal, of the article from the carrier.

The invention consists in the novel features and in the combinations and constructions hereinafter set forth and claimed.

In describing this invention, reference is had to the accompanying drawings, in which like characters designate corresponding parts in all the views.

In the drawings—

FIGURE 1 is a perspective view of a carrier embodying my invention.

FIGURE 2 is a view taken on line 2—2, FIGURE 1.

Figure 3:
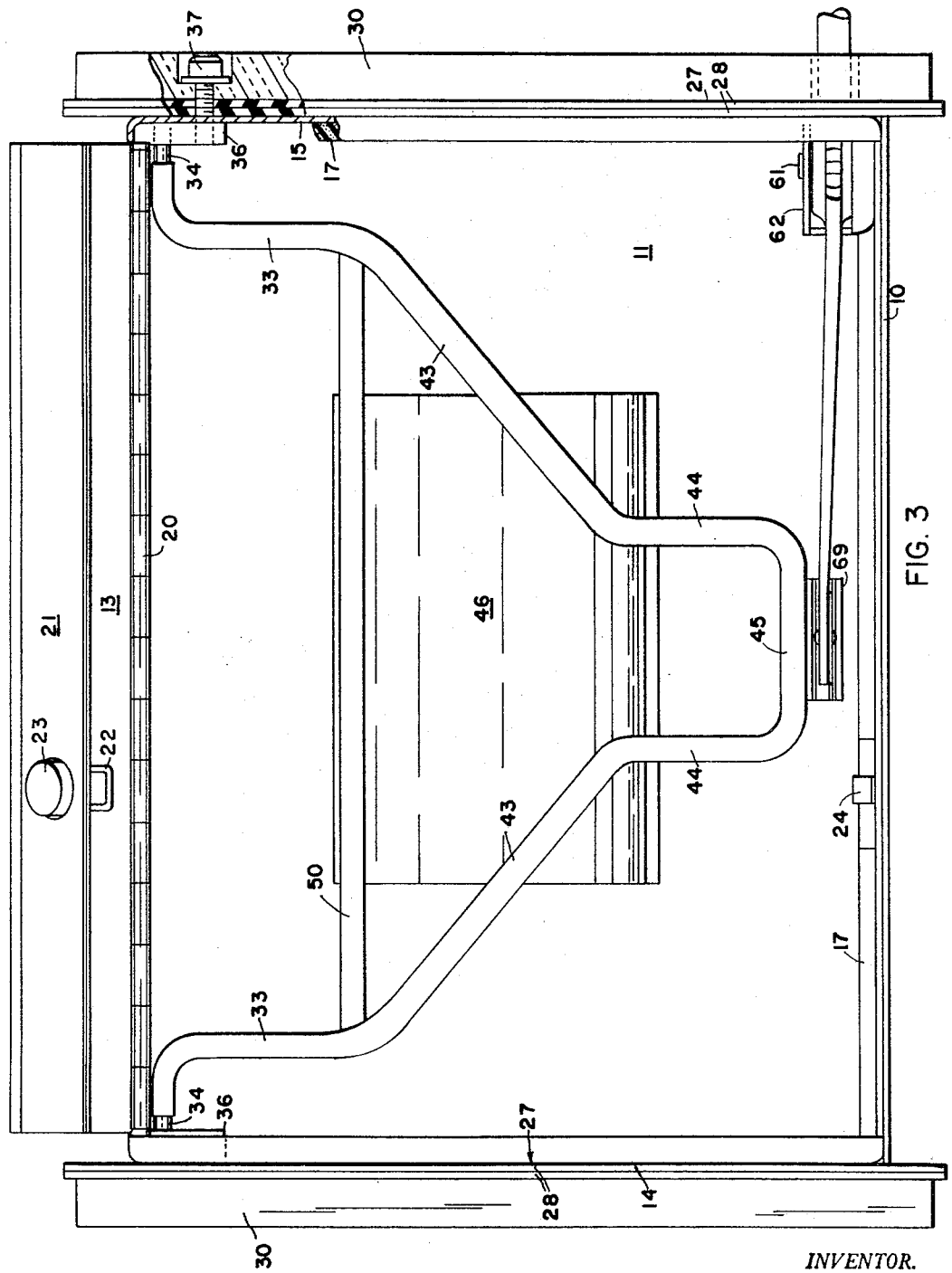
FIGURE 3 is a top plan view of the carrier with the door, or cover, moved to open position.

The carrier shown in the drawings is of rectangular form having side walls 10, 11, 12 and 13, and end walls 14, 15. The side and end walls are preferably formed of sheet metal and a layer of fibrous material, such as felt 17, is affixed to the inner surface of these walls.

The carrier is formed with an opening to permit insertion and removal of articles from the carrier. In the form shown, the side wall 13 is attached along one edge to the wall 12 by a piano hinge 20, and is formed along its opposite edge with a flange 21 arranged in alignment with the wall 10, which is of reduced height. A spring latch 22, FIGURE 2, overlies the inner surface of the flange 11 and carries a button 23 extending through an apereure formed in the flange 21. A keeper 24 is fixedly secured to the inner surface of the wall 10. The arrangement is such that when the wall 13, serving in this case as a cover for the carrier, is closed, the latch 22 snaps under the keeper 24 and is moved out of engagement therewith by inward pressure on the button 23. The cover is shown in open position in FIGURE 3 of the drawings.

Accelerator members 27 are fixedly secured to the walls 14, 15 and have a perimetric portion 28 extending outwardly from the walls 10, 11, 12 and 13. These accelerator members are formed of yieldable material and are dimensioned for a close fit with the interior of the pneumatice tube. A bumper 30 of felt, or similar material, is positioned on the accelerator members 27 and fixedly secured to the end walls 14, 15.

An article clamping member is mounted within the carrier and is movable into and out of engagement with an article therein, such as a book B. The clamping member here shown is of general U-formation, the leg portions 33 of which are formed at their ends with trunnions 34 positioned in slots 35 formed in retaining members 36 fixedly secured to the walls 14, 15, adjacent the wall 12, as by screws 37. The slots 35 extend parallel to the wall 12 and are formed with a plurality of projections 40 between which the trunnions 34 are positioned. With this arrangement, the clamping member is pivotally mounted in the recesses between the projections 40 for movement toward and from the article, as the book B.

The legs 33 of the clamping member have converging portions 43 which merge with parallel portions 44 which, in turn, merge with an intermediate portion 45 which, when the clamping member is in operative clamping position, is located adjacent the wall 10 and the flange 21 of the cover wall 13. A yieldable article engaging pad 46 is secured at one edge to the portions 44 of the clamping member, as by being welded thereto. The opposite edge has free engagement with a cross bar 50.

After the article is placed in the carrier, the trunnions 34 of the clamping member are positioned in like selected recesses between the projections 40 of the retaining members, which recesses are selected according to the thickness of the article. In FIGURE 2, the article is illustrated in the form of a thick book B and accordingly, the trunnions 34 are positioned in the topmost notches of the retainers 36. The clamping member is then moved down into engagement with the book and is maintained under pressure against the book.

Figure 4:
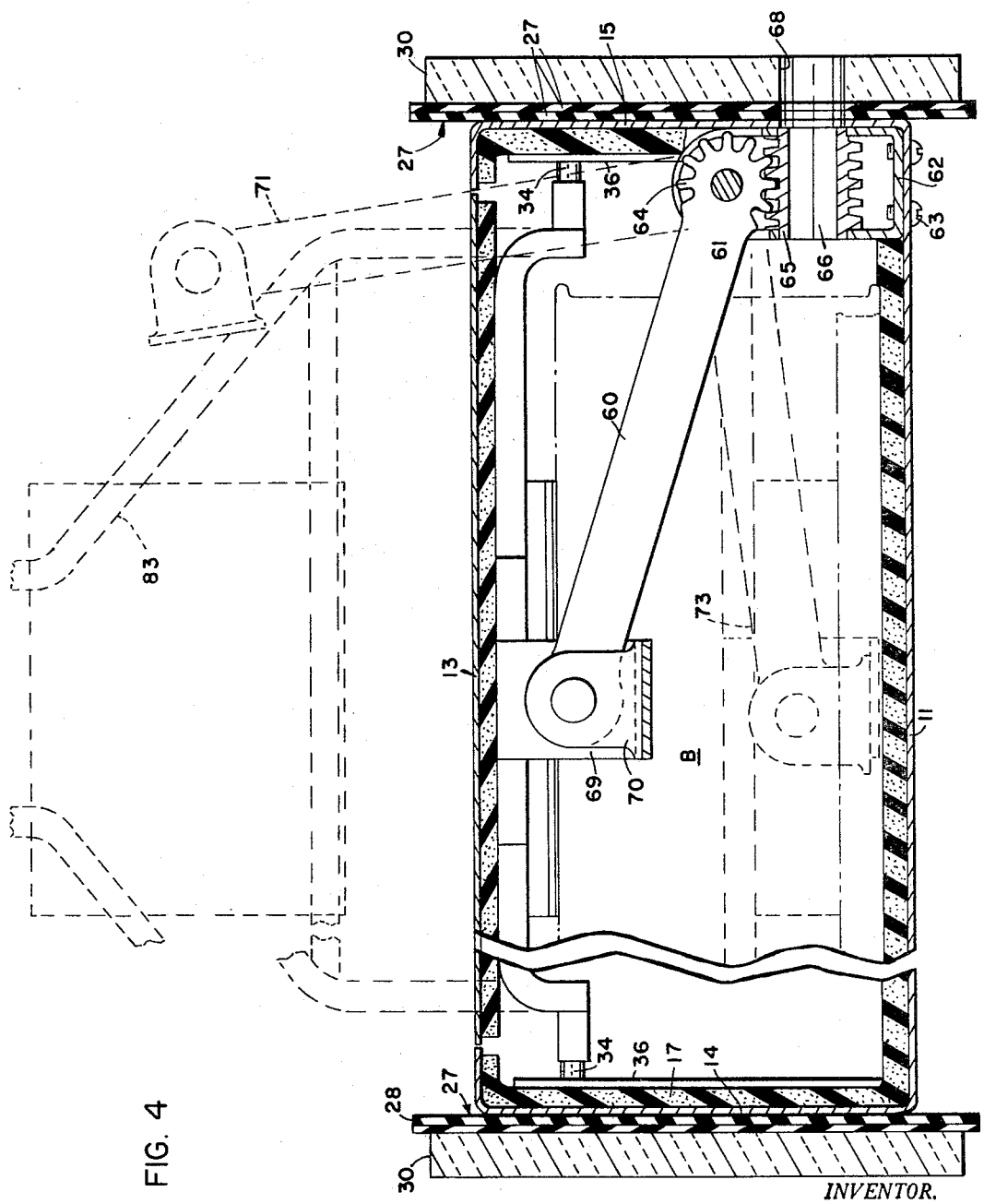
FIGURE 4 is a view taken on line 4—4, FIGURE 2.

The mechanism for pressurizing the clamping member consists of an arm 60 mounted at one end for pivotal movement about a pin 61 mounted in a bracket 62 fixedly secured to the wall 11, as by screws 63, see FIGURES 2 and 4. The pivoted end of the arm 60 is formed with gear teeth 64 which mesh with a worm 65 journalled in the bracket 62 and having its axis extending normal to the axis of the pin 61. The worm 65 is formed with a square bore 66 for the reception of an operating crank 67, see FIGURE 1, which is insertable through an aperture 68 formed in one of the bumpers 30 and the side wall 15.

The clamping member is provided with a hook 69 fixedly secured to the intermediate portion 45. The hook 69 is engaged by a member 70 pivotally mounted to the free end of the arm 60. Upon rotation of the worm 65 in one direction, the arm 60 is moved to a substantially vertical position as indicated at 71, FIGURE 4. Upon rotation of the worm 65 in the opposite direction, the arm is caused to pivot about the pin 61 to bring the member 70 into engagement with the hook portion 69 of the clamping member, and force the same downwardly to cause the pad 46 to engage the hook under pressure. The worm gear arrangement is self-locking, so that the pressure of the clamping member against the book is maintained.

If the article is of small dimension in one direction, such as a thin book, the trunnions 34 are positioned in the bottom notch in the retaining plates 36, and the worm 65 rotated to bring the arm downwardly into engagement with the clamping member, as indicated in the dotted line position at 73, FIGURE 4.

When the carrier arrives at its destination, the cover wall 13 is unlatched and moved to open position, as shown in FIGURE 3, the crank inserted into the worm 65 for rotation thereof in a direction to move the arm 60 to vertical position, whereupon the clamping member may be moved about its pivot to vertical position, as indicated in dotted outline at 83, FIGURE 4, and the book removed from the carrier.

It will be apparent that the clamping mechanism described permits ready access to the entire interior of the carrier for the insertion of an article therein, and the removal of an article therefrom. Also that during the transport, the article is tightly clamped against the wall 11, preventing any movement of the article in the carrier during the transport.

What I claim is:

1. A carrier for pneumatic tube systems, said carrier being formed with side and end walls, an article clamping member pivotally mounted at one end adjacent one of said side walls and extending across the carrier, with the opposite end of said member terminating adjacent the opposite side wall of the carrier, said clamping member being movable about said pivotal mounting into engagement with an article positioned on a third intermediate side wall, an arm pivotally mounted at one end in the carrier for movement in a plane parallel and adjacent to said opposite side wall, actuating means operable to move said arm about its pivotal mounting to bring the opposite end of said arm into engagement with the said opposite end of said clamping member to move said clamping member under pressure against the article, said actuating means including self locking mechanism operable to maintain said arm under clamping pressure.

2. A carrier for pneumatic tube systems, said carrier being formed with side and end walls, an article clamping member pivotally mounted at one end adjacent one of said side walls and extending across the carrier, with the opposite end of said member terminating adjacent the opposite side wall of the carrier, said clamping member being movable about said pivotal mounting into engagement with an article positioned on a third intermediate side wall, a bracket mounted in a corner of the carrier at one end of said opposite side wall, a pressure exerting and locking arm pivotally mounted at one end in said bracket and extending in parallel adjacency to said opposite side wall, said arm being provided with a circular series of gear teeth, a worm journalled in said bracket and arranged in mesh with said gear teeth, means operable externally of the carrier for rotating said worm, said worm being operable upon rotation in one direction to move said arm in a direction away from said intermediate side wall and, upon rotation in the opposite direction, to move said arm into engagement with the said opposite end of said clamping member to force said member under pressure against an article to clamp the same against said intermediate side wall.

3. An article carrier for pneumatic tube systems, said carrier being formed with side walls, an article clamping member pivotally mounted in the carrier for movement from a position exteriorly of the carrier toward one wall thereof into and out of clamping engagement with an article positioned on said one wall, means operable externally of the carrier for moving said clamping member under pressure against the article to clamp the same against said one wall, and being operable to release said clamping member for movement out of engagement with the article, said pivotal mounting of said clamping member being adjustable toward and from said one wall to accommodate articles of different thickness.

References Cited by the Examiner

UNITED STATES PATENTS

| | | | |
|---|---|---|---|
| 303,531 | 8/1884 | Lovejoy | 186—31 |
| 504,268 | 8/1893 | Harper | 24—250 |
| 1,218,070 | 3/1917 | Fischowitz | 23—250 |
| 1,492,734 | 5/1924 | Maclaren | 243—32 |
| 1,613,471 | 1/1927 | Maclaren | 243—32 |
| 1,638,047 | 8/1927 | Maclaren | 243—39 |
| 2,551,515 | 5/1951 | Tschirf | 24—250 |

EVON C. BLUNK, *Primary Examiner.*

HUGO O. SCHULZ, *Examiner.*

H. C. HORNSBY, *Assistant Examiner.*